C. E. PERKINS.
UNIVERSAL JOINT.
APPLICATION FILED MAY 10, 1915.

1,179,334.

Patented Apr. 11, 1916.

WITNESSES:
D. W. Bradford
Ray W. Longfield
Henrietta K. Vander Myde

INVENTOR.
Charles E. Perkins.
BY Cyrus W. Rice
ATTORNEY.

UNITED STATES PATENT OFFICE.

CHARLES E. PERKINS, OF GRAND RAPIDS, MICHIGAN.

UNIVERSAL JOINT.

1,179,334.        Specification of Letters Patent.     Patented Apr. 11, 1916.

Application filed May 10, 1915. Serial No. 26,923.

*To all whom it may concern:*

Be it known that I, CHARLES E. PERKINS, a citizen of the United States, residing at Grand Rapids, in the county of Kent and State of Michigan, have invented new and useful Improvements in Universal Joints, of which the following is a specification.

My present invention relates to universal joints, such as are employed to connect rotatable shafts not alined; and its object is to provide an improved joint of that character which shall have means for taking up the wear of its bearing parts; and further, whose parts may be readily assembled. This and any other objects appearing hereinafter, are attained by, and the invention finds a preferable embodiment in, the structure hereinafter described and illustrated by the accompanying drawings, in which:—

Figure 1:
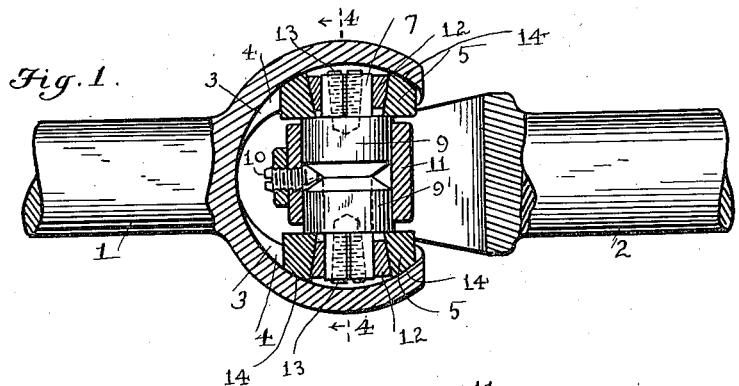
Figure 2:
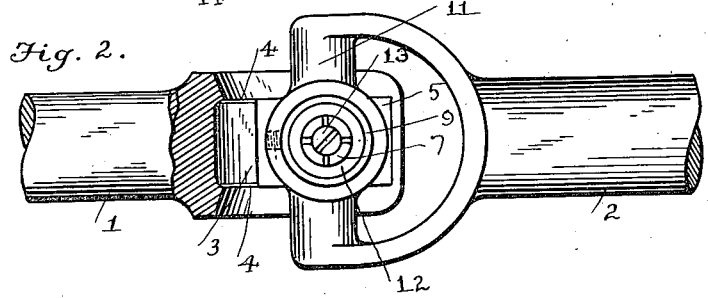
Figure 3:
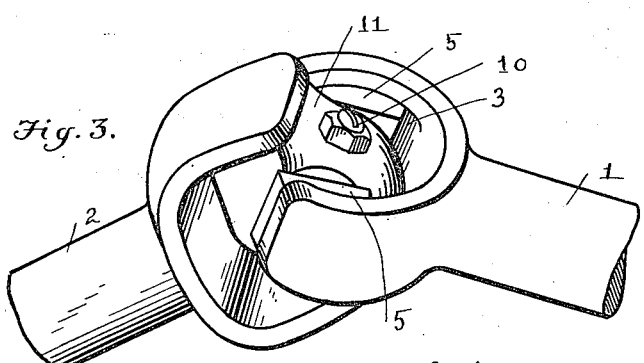
Figure 4:
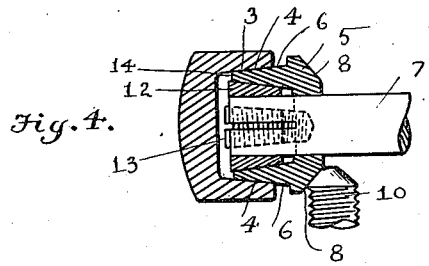

Figure 1 is a side view of my universal joint, certain parts being sectioned; Fig. 2 is a similar view, the shaft members being turned at right-angles to their position shown in Fig. 1; Fig. 3 is a view in perspective of the joint, the shaft members being shown out of alinement; and, Fig. 4 is an axially sectional view of certain parts taken on a plane corresponding with line 4—4 of Fig. 1.

The rotatable shaft members 1 and 2, either of which may be the driven shaft, are connected by the universal joint. One of these shafts, 1 is provided with an internal arcuate groove 3 whose axis is at right-angles to that of such shaft and whose sides 4 converge toward the bottom of the groove. The connecting member comprises oppositely-disposed segments 5 rocking in the groove longitudinally and having converging sides 6 corresponding to the sides 4 of the groove. These segments are pivotally carried by the other shaft member 2 by a spindle 7 whose axis is at right-angles to that of said shaft member 2. The inner faces 8 of the segments, as particularly shown in Fig. 4, or those of the collars 9 surrounding the spindle and abutting against the inner faces of the segments as shown in other figures, are relatively inclined as shown, so as to be forced apart by wedging means, as by the conically-pointed set-screw 10 threaded in a cross bar 11, of shaft member 2. Each end of the spindle has a conical bearing, whose base is disposed outwardly, on which the segment is carried, its bore being contracted inwardly. Preferably this conical bearing is a separate piece and formed as a collar 12 surrounding and adjustable on the spindle as shown.

Means are provided for locking the collar in adjusted position on the spindle, such means being, in the construction shown, a tapering screw 13 threaded in the split end of the spindle and adapted to be turned to expand such end into holding contact with the collar.

It will be seen that as the segments become worn, the wear may be taken up and the bearing of the segments in the groove may be tightened, by turning the screw 10 down to force the converging sides of the segments and the groove into proper contact, and that the wear on the outer faces 14 of the segments may be similarly taken up, which face wear would be taken up in the same manner though the sides did not so converge. The outer faces 14 may be shortened, as shown in Fig. 4 so as not to reach the bottom of the groove, to insure at all times proper contact at the sides; although, should these outer faces wear more slowly than the sides, the parts may be readily disassembled and such faces shortened so as to permit a proper contact of the sides.

The wear on the bore of the segment and its bearing is taken up in the same way; for the screw 10 being turned in the direction to take up the wear in the groove 3, also takes up the wear of the bore and bearing by forcing the segment outwardly on such conical bearing. By forming the conical bearing as a collar 12 surrounding the spindle as shown, its position longitudinally of the spindle may be adjusted and locked by the screw 13 in such adjustment, in case the bore and bearing wear faster or slower than the segment in the groove 3.

The groove as shown has an arcuate extension of more than a half circle to hold the segments therein: It will be seen however, that the segments may be inserted into and removed from the groove, to assemble or disassemble the parts, (and without changing the relative direction of the shaft members), by merely turning the screw sufficiently to permit the segments to be moved toward each other far enough to pass the mouth of the groove; whereupon the screw, being oppositely turned, will cause the proper contact between the groove and the segments. It will be seen too, that the described adjusting of the segments will also take up any wear occasioned by the relative endwise movement of the shaft members.

By constructing the parts so that the arcuate groove is in the shaft as shown, the lubricant is kept in the groove by centrifugal force and is thus prevented from being thrown out by such force.

The invention being intended to be defined solely by the claims, is not to be limited by details of construction shown or described.

What is claimed is:—

1. In a universal joint; shaft members; a connecting member therefor comprising oppositely-disposed segments rocking on the first shaft member and rocking on the second shaft member; conical bearings for said rocking movement, whose bases are outwardly disposed; and means for adjusting the segments toward and away from each other.

2. In a universal joint; shaft members; a connecting member therefor comprising oppositely-disposed segments rocking on the first shaft member and rocking on the second shaft member; conical bearings for said rocking movement, adjustable inwardly and outwardly and whose bases are outwardly disposed; and means for adjusting the segments toward and away from each other.

3. In a universal joint; shaft members; a connecting member therefor comprising oppositely disposed segments rocking on the first shaft member; a spindle carried by the second shaft member at right angles to its axis and having split ends containing expanding screws; adjustable conical bearings for the segments, whose bases are outwardly disposed, and which are adapted to be held in adjusted position on the spindle by the expanding screws; and means for adjusting the segments toward and away from each other.

4. In a universal joint; shaft members; a connecting member therefor comprising oppositely-disposed segments rocking on the first shaft member in an arcuate bearing of more than a half circle, and rocking on the second shaft member; conical bearings for the second shaft member's rocking movement whose bases are outwardly disposed; and means for adjusting the segments toward and away from each other.

5. In a universal joint; a first shaft member; a connecting member rocking on the first shaft member and comprising oppositely-disposed segments, one of said members having an arcuate groove bearing for such rocking movement whose sides converge toward the bottom of the groove, and the other said member having inclined sides corresponding to and engaging those of the groove; a second shaft member having conical bearings for the segments, whose bases are outwardly disposed; and means for adjusting the segments toward and away from each other.

6. In a universal joint; a first shaft member; a connecting member rocking on the first shaft member and comprising oppositely-disposed segments, one of said members having an arcuate groove bearing of more than a half circle for such rocking movement whose sides converge toward the bottom of the groove, and the other said member having inclined sides corresponding to and engaging those of the groove; a second shaft member having conical bearings for the segments, whose bases are outwardly disposed; and means for adjusting the segments toward and away from each other.

7. In a universal joint; a first shaft member; a connecting member rocking on the first shaft member and comprising oppositely-disposed segments, one of said members having an arcuate groove bearing for such rocking movement whose sides converge toward the bottom of the groove, and the other said member having inclined sides corresponding to and engaging those of the groove; a second shaft member having conical bearings for the segments, whose bases are outwardly disposed; and a conically-pointed set screw threaded on the second shaft member and adapted to adjust by its turning movement the segments toward and away from each other.

8. In a universal joint; a first shaft member; a connecting member rocking on the first shaft member and comprising oppositely-disposed segments, one of said members having an arcuate groove bearing for such rocking movement whose sides converge toward the bottom of the groove, and the other said member having inclined sides corresponding to and engaging those of the groove; a second shaft member having conical bearings for the segments, whose bases are outwardly disposed; and wedging means engaging between the segments and adapted to adjust them toward and away from each other.

9. In a universal joint; shaft members; a connecting member therefor comprising oppositely-disposed segments rocking on the first shaft member, and rocking on the second shaft member; conical bearings for the second shaft member's rocking movement whose bases are outwardly disposed; and a conically-pointed set screw threaded on the second shaft member and adapted to adjust by its turning movement the segment toward and away from each other.

10. In a universal joint; shaft members; a connecting member therefor comprising oppositely-disposed segments rocking on the first shaft member, and rocking on the second shaft member; conical bearings for the second shaft member's rocking movement whose bases are outwardly disposed; and wedging means engaging between the segments and adapted to adjust them toward and away from each other.

11. In a universal joint; shaft members; a connecting member therefor comprising oppositely-disposed segments rocking on the first shaft member and rocking on the second shaft member; conical bearings for the second shaft member's rocking movement and means for adjusting the segments relatively to the conical bearings to take up the wear thereof.

In testimony whereof I have hereunto set my hand in presence of two subscribing witnesses.

CHARLES E. PERKINS.

Witnesses:
 CYRUS W. RICE,
 HENRIETTA K. VANDER MYDE.